Patented Jan. 29, 1946

2,393,774

UNITED STATES PATENT OFFICE 2,393,774

PLASTIC CEMENT

Arnold J. Hoiberg, William C. Ware, and Charles C. Wilch, El Dorado, Ark., assignors to Lion Oil Company, a corporation of Delaware No Drawing. Application January 31, 1942, Serial No. 429,108

3 Claims. (Cl. 106—280)

This invention relates to plastic cements, and more particularly to plastic cements of a bituminous nature.

Among the objects of this invention are the provision of an improved plastic cement of a bituminous nature; the provision of a plastic cement which may be prepared from easily available by-product or similar materials and which has more desirable properties in use. Other objects will be in part apparent and in part pointed out hereinafter.

The invention accordingly comprises the ingredients and combinations of ingredients, the proportions thereof, steps and sequence of steps, and features of composition and manipulation, which will be exemplified in the products and methods hereinafter described, and the scope of the application of which will be indicated in the following claims.

Plastic cements, and more particularly, such cements of a bituminous nature and of troweling consistency, are adapted for repairing metal or composition roofing, for damp-proofing the inside of masonry walls above ground, the waterproofing of the outside of foundation walls below ground, and similar purposes. The plastic cements or asphalt putties are customarily composed of two or more of the following constituents: A bituminous base, a mineral filler, a fibrous material and a volatile solvent.

According to the present invention, it has been found that a plastic cement having improved properties may be prepared by using, in lieu of the customary mineral filler, a finely divided substance capable of absorption or adsorption of naturally occurring constituents of petroleum, of the petroleum itself, or fractions thereof. This finely divided substance is pre-treated with a petroleum fraction so that it is in effect impregnated thereby.

Such finely divided substances having absorption or adsorption properties are customarily employed for the removal of constituents, either naturally occurring in petroleum or which are formed in petroleum fractions by treatment thereof. For example, clay is employed for the removal of polymerizable and acid constituents, particularly from petroleum distillates. As this treatment is carried out the clay becomes gradually impregnated with the polymerizable and acid substances which are either formed or naturally occurring. The exhausted clay is a finely divided substance of the character indicated and is the preferred material for use in the present invention. This spent clay is a dark-colored, finely divided appearing material, heretofore of little value per se to industry, and is usually either thrown away or is revivified by burning out the petroleum substances contained therein.

According to the present invention a plastic cement having a penetration of 200 to 350 when measured by A. S. T. M. method D217-38T is prepared as follows:

Asphalt, in the proportion of 35 to 50% by weight, having a softening point by the ring and ball method, of 150 to 220° F., and a penetration at 77° F. of 10 to 40, is the preferred bituminous substance. This asphalt may be a straight run, blown, or a natural asphalt, or a combination of any of these.

A solvent in the ratio of 10 to 20% by weight is likewise employed. Any volatile solvent in which the asphalt or bituminous base will dissolve is suitable. One having a boiling range of from 200° F. to 500° F. is satisfactory. If a quick setting cement is required, a naphtha boiling from 200 to 400° F. may be used. For most purposes, however, a kerosene boiling in the range of from 300 to 500° F. is the preferred solvent.

The filler employed is made up of two constituents. These are from 5 to 20% by weight of asbestos or other fibers and from 20 to 40% by weight of a finely divided substance impregnated with a petroleum material, spent clay being the preferred example. The asbestos fiber is added to bind the base together, and to form a tougher mass, which when set will show substantially no tendency to flow under hot summer conditions.

Depending upon the oil content of the spent clay, the melting point of the asphalt utilized is preferably increased somewhat above that of the bituminous base which is used with the customary fresh clay. This counteracts the softening effect of the lubricating oil absorbed in the clay. This increase in melting point does not usually amount to more than 15° F.

Exemplary of a composition of the class described above is one having the following proportions by weight: 40% asphalt, having a softening point of 180–200° F., and a penetration at 77° F. of 20 to 30; 15% kerosene, having an initial boiling point of 300 to 350° F., and an end point of 475 to 525° F.; 11% asbestos fiber; and 34% of oil impregnated clay.

The preferred method for preparing the plastic cement is to add the filler to a cut-back of the kerosene and asphalt. The penetration of the finished cement is usually from 250 to 300 on the A. S. T. M. standard above mentioned. Minor adjustments may be made if necessary, by adding more solvent or filler. Use of spent clay in lieu of the hitherto utilized fresh clay, besides markedly reducing the cost of the final product, has been found to improve the easy-spreading properties of the cement, and in addition to facilitate adhesion thereof to damp or wet surfaces. This improved adhesion is readily demonstrated by coating strips of wood or metal held under water with the plastic cement of the present invention, and with a plastic cement prepared as hitherto customary. It will be found that much less effort is required in spreading to a uniformly thick adherent coating the plastic of the present invention. Strips of metal, such as copper, galvanized metals and aluminum, when coated with the plastic cement of the present invention, show no signs of corrosion after a substantial period of time. Early failure caused by absorption of oil from the asphalt does not occur with the plastic cement of the present invention. Such absorption is detrimental and it causes a hardening and consequent imbrittlement of the plastic cement in service.

In lieu of the impregnated or spent clay, fresh clay may be merely soaked in lubricating oil or other similar petroleum fraction and substituted.

Where the plastic cement is to be used for coating metals, such as galvanized metal, the finely divided impregnated filler, such as spent clay, is preferably treated with a hydroxide which forms water-soluble salts with the spent clay. Typical of the hydroxides which may be employed is potassium hydroxide, although sodium hydroxide may be substituted. Even greater ability to be spread is obtained with spent clay which has been treated with caustic alkalis or hydroxides of the type indicated. This improved ability to be spread is marked where the plastic cement is applied under water.

In view of the above, it will be seen that the several objects of the invention are achieved and other advantageous results attained.

As many changes could be made in the above methods and products without departing from the scope of the invention, it is intended that all matter contained in the above description shall be interpreted as illustrative and not in a limiting sense.

We claim:

1. A plastic cement comprising a bituminous substance, a volatile solvent for said bituminous substance and a substantially fully spent clay filler, said filler being impregnated with a petroleum fraction including polymerizable hydrocarbons, said filler material having been reacted with a caustic alkali, said plastic cement being easily spreadable and having improved adhesion to wet surfaces.

2. A plastic cement comprising a bituminous substance, a volatile solvent for said bituminous substance and a substantially fully spent clay filler, said filler being impregnated with a petroleum fraction including polymerizable hydrocarbons, said filler material having been reacted with an alkali metal hydroxide, said plastic cement being easily spreadable and having improved adhesion to wet surfaces.

3. A plastic cement comprising a bituminous substance, a volatile solvent for said bituminous substance and a substantially fully spent clay filler, said filler being impregnated with a petroleum fraction including polymerizable hydrocarbons, said filler material having been reacted with potassium hydroxide, said plastic cement being easily spreadable and having improved adhesion to wet surfaces.

ARNOLD J. HOIBERG.
WILLIAM C. WARE.
CHARLES C. WILCH.